United States Patent
Shin et al.

(10) Patent No.: US 8,045,270 B2
(45) Date of Patent: Oct. 25, 2011

(54) OPTICAL SHEET AND A TILED DISPLAY INCLUDING THE SAME

(75) Inventors: Ki-Chul Shin, Asan-si (KR); Seung-Mo Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 12/730,579

(22) Filed: Mar. 24, 2010

(65) Prior Publication Data

US 2011/0038051 A1    Feb. 17, 2011

(30) Foreign Application Priority Data

Aug. 17, 2009   (KR) .................. 10-2009-0075894

(51) Int. Cl.
  *G02B 27/10*    (2006.01)
  *G03B 21/60*    (2006.01)
(52) U.S. Cl. .................... 359/619; 359/455; 359/618
(58) Field of Classification Search .......... 359/618–621, 359/626, 443, 454–455; 264/1.1, 1.32, 2.7
See application file for complete search history.

(56) References Cited

U.S. PATENT DOCUMENTS

| | | | | |
|---|---|---|---|---|
| 5,764,319 | A * | 6/1998 | Nishihara | 349/8 |
| 6,621,533 | B2 * | 9/2003 | Slack et al. | 349/5 |
| 7,145,611 | B2 | 12/2006 | Dubin et al. | |
| 7,439,938 | B2 | 10/2008 | Cho et al. | |
| 2002/0093737 | A1 * | 7/2002 | Itoh et al. | 359/487 |
| 2004/0027676 | A1 * | 2/2004 | Nilsen et al. | 359/619 |
| 2004/0093737 | A1 * | 5/2004 | Mauro | 30/113.1 |
| 2005/0180018 | A1 * | 8/2005 | Yamanaka et al. | 359/619 |
| 2006/0204745 | A1 * | 9/2006 | Jones et al. | 428/328 |
| 2009/0244270 | A1 * | 10/2009 | Takagi et al. | 348/58 |

FOREIGN PATENT DOCUMENTS

| | | |
|---|---|---|
| JP | 07-261272 | 10/1995 |
| JP | 08-136886 | 5/1996 |
| JP | 2003-157031 | 5/2003 |
| KR | 1020000075222 | 12/2000 |
| KR | 1020000075223 | 12/2000 |
| KR | 1020010099170 | 11/2001 |
| KR | 200291586 | 9/2002 |
| KR | 1020030088835 | 11/2003 |
| KR | 1020030093614 | 12/2003 |
| KR | 1020040050433 | 6/2004 |
| KR | 1020050006650 | 1/2005 |
| KR | 1020060001661 | 1/2006 |
| KR | 1020060001667 | 1/2006 |
| KR | 1020060072737 | 6/2006 |
| KR | 1020060121574 | 11/2006 |

* cited by examiner

*Primary Examiner* — Dawayne Pinkney (74) *Attorney, Agent, or Firm* — F. Chau & Associates, LLC (57) ABSTRACT

A tiled display device including a plurality of display panels, a lenticular pattern disposed on a display panel, a base film disposed on the lenticular pattern and a prism pattern disposed on the base film.

18 Claims, 7 Drawing Sheets

OPTICAL SHEET AND A TILED DISPLAY INCLUDING THE SAME

CROSS-REFERENCE TO RELATED APPLICATION

This application claims priority to Korean Patent Application No. 10-2009-0075894 filed in the Korean Intellectual Property Office on Aug. 17, 2009, the disclosure of which is incorporated by reference herein in its entirety.

BACKGROUND

1. Technical Field

The present invention relates to an optical sheet and a tiled display device including the same.

2. Discussion of the Related Art

In general, a flat panel display such as a liquid crystal display (LCD), an organic light emitting diode (OLED) display, and an electrophoretic display includes a plurality of pairs of field generating electrodes and electro-optical active layers that are interposed therebetween. The LCD includes a liquid crystal layer as the electro-optical active layer, and the OLED display includes an organic light emitting layer as the electro-optical active layer. To display an image, one of the field generating electrodes of a field generating electrode pair is connected to a switching element to receive an electrical signal, and an electro-optical active layer converts the electrical signal to an optical signal.

To manufacture a large display device for an outdoor advertisement, a tiled display in which a plurality of display devices are connected to each other is employed, for example. The large size of the tiled display device is realized by fixing a plurality of display panels having a predetermined size to a mounting frame. However, bezels, which are the borders separating the display panels, can be seen such that the display quality of the tiled display device may be deteriorated.

Accordingly, there is a need to improve the display quality of a tiled display device.

SUMMARY

A tiled display device according to an exemplary embodiment of the present invention includes a plurality of display panels, a first lenticular pattern disposed on a display panel, a base film disposed on the first lenticular pattern, and a first prism pattern disposed on the base film.

A chassis disposed between the plurality of display panels may be further included.

The first prism pattern may be part of a plurality of prism patterns covering an entire width of the chassis.

The first lenticular pattern may be disposed between the plurality of display panels, and the first prism pattern may be disposed between the plurality of display panels.

A ratio of a width of the first lenticular pattern to a width of the first prism pattern may be in a range of about 1:1 to about 6:1.

A second lenticular pattern separated from the first lenticular pattern may be included, and a ratio of the width of the first lenticular pattern to a distance by which the first and second lenticular patterns are separated may be in a range of about 1:1 to about 8:1.

A second prism pattern may be included, and boundaries of the first and second prism patterns may meet each other.

The width of the first lenticular pattern may be less than about 200 μm.

A curvature angle of the first lenticular pattern may be in a range of about 30 degrees to about 60 degrees, and a curvature radius ratio of the first lenticular pattern may be in a range of 0.5 to 5.

The width of the first prism pattern may be more than about 50 μm.

An angle of a top portion of the first prism pattern may be in a range of about 70 degrees to about 110 degrees.

An optical sheet according to an exemplary embodiment of the present invention includes a base film, a first lenticular pattern disposed on a first side of the base film, and a first prism pattern disposed on a second side of the base film.

A ratio of a width of the first lenticular pattern to a width of the first prism pattern may be in a range of about 1:1 to about 6:1.

A second lenticular pattern separated from the first lenticular pattern may be included, and a ratio of a width of the first lenticular pattern to a distance by which the first and second lenticular patterns are separated from each other may be in a range of about 1:1 to about 8:1.

A second prism pattern may be included, and boundaries of the first and second prism patterns may meet each other.

A width of the first lenticular pattern may be less than about 200 μm.

A curvature angle of the first lenticular pattern may be in a range of about 30 degrees to about 60 degrees, and a curvature radius ratio of the first lenticular pattern may be in a range of about 0.5 to about 5.

A width of the first prism pattern may be more than about 50 μm.

An angle of a top portion of the first prism pattern may be in a range of about 70 degrees to about 110 degrees.

The first prism pattern may overlap the first lenticular pattern.

DETAILED DESCRIPTION OF EXEMPLARY EMBODIMENTS

Exemplary embodiments of the present invention will be described more fully hereinafter with reference to the accompanying drawings. However, the present invention may be embodied in various different ways and should not be construed as limited to the exemplary embodiments described herein. In the drawings, like reference numerals may designate like elements.

In the drawings, the thickness of layers, films, panels, regions, etc., may be exaggerated for clarity. It will be understood that when an element such as a layer, film, region, or substrate is referred to as being "on" another element, it can be directly on the other element or intervening elements may also be present.

Next, a tiled display device according to an exemplary embodiment of the present invention will be described with reference to FIG. 1 to FIG. 4. Hereafter, the tiled display device will be described as a tiled liquid crystal display using a liquid crystal panel as an example.

Figure 1:
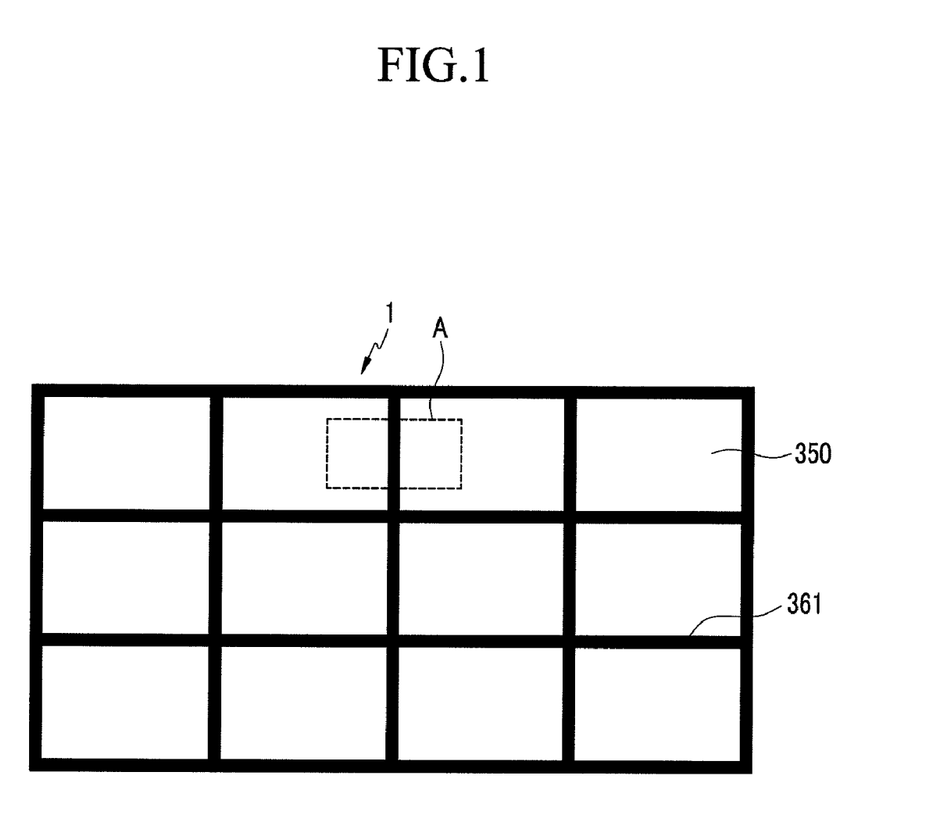
FIG. 1 is a schematic diagram of a tiled liquid crystal display according to an exemplary embodiment of the present invention.
Figure 2:
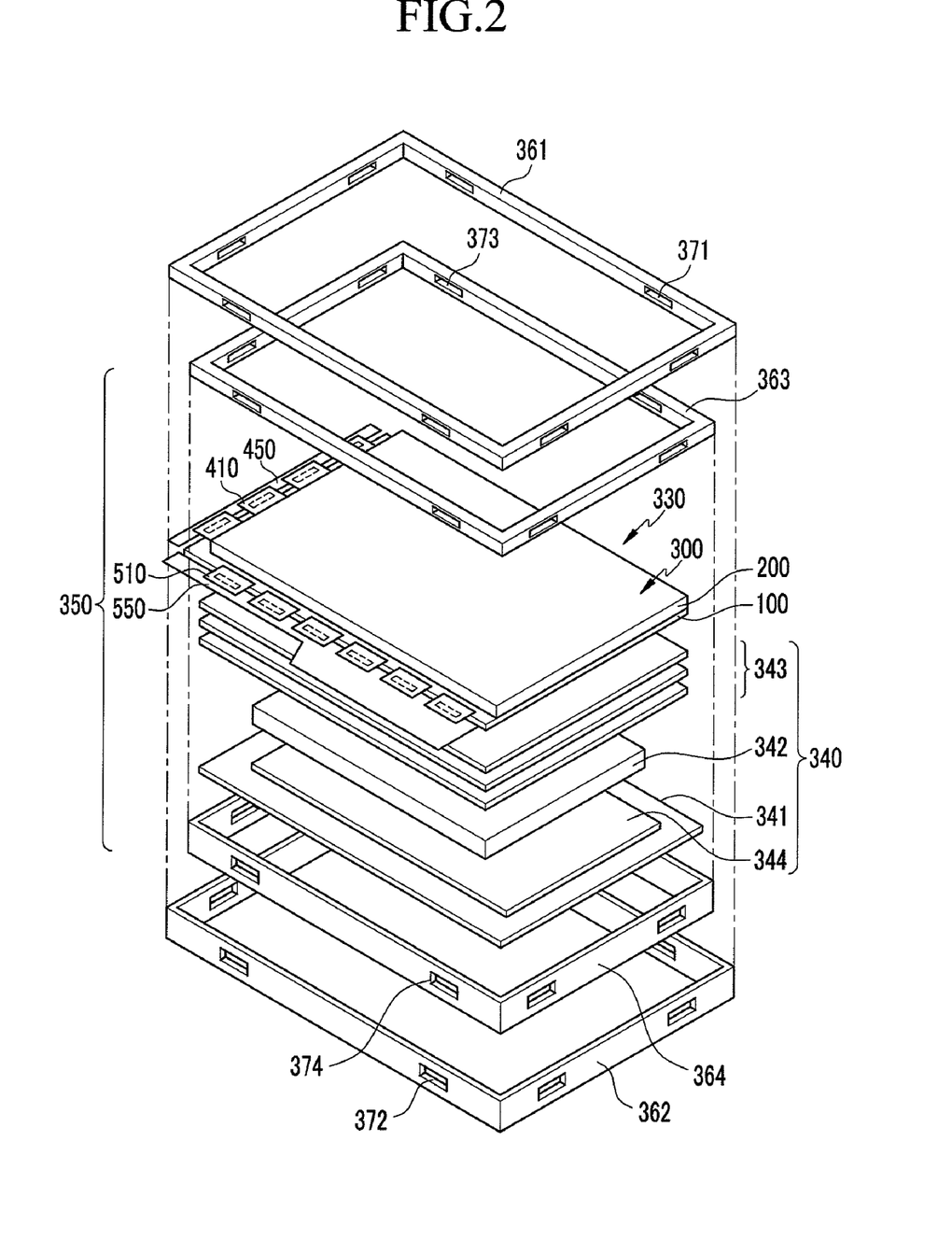
FIG. 2 is an exploded perspective view showing a liquid crystal display of the tiled liquid crystal display of FIG. 1.
Figure 3:
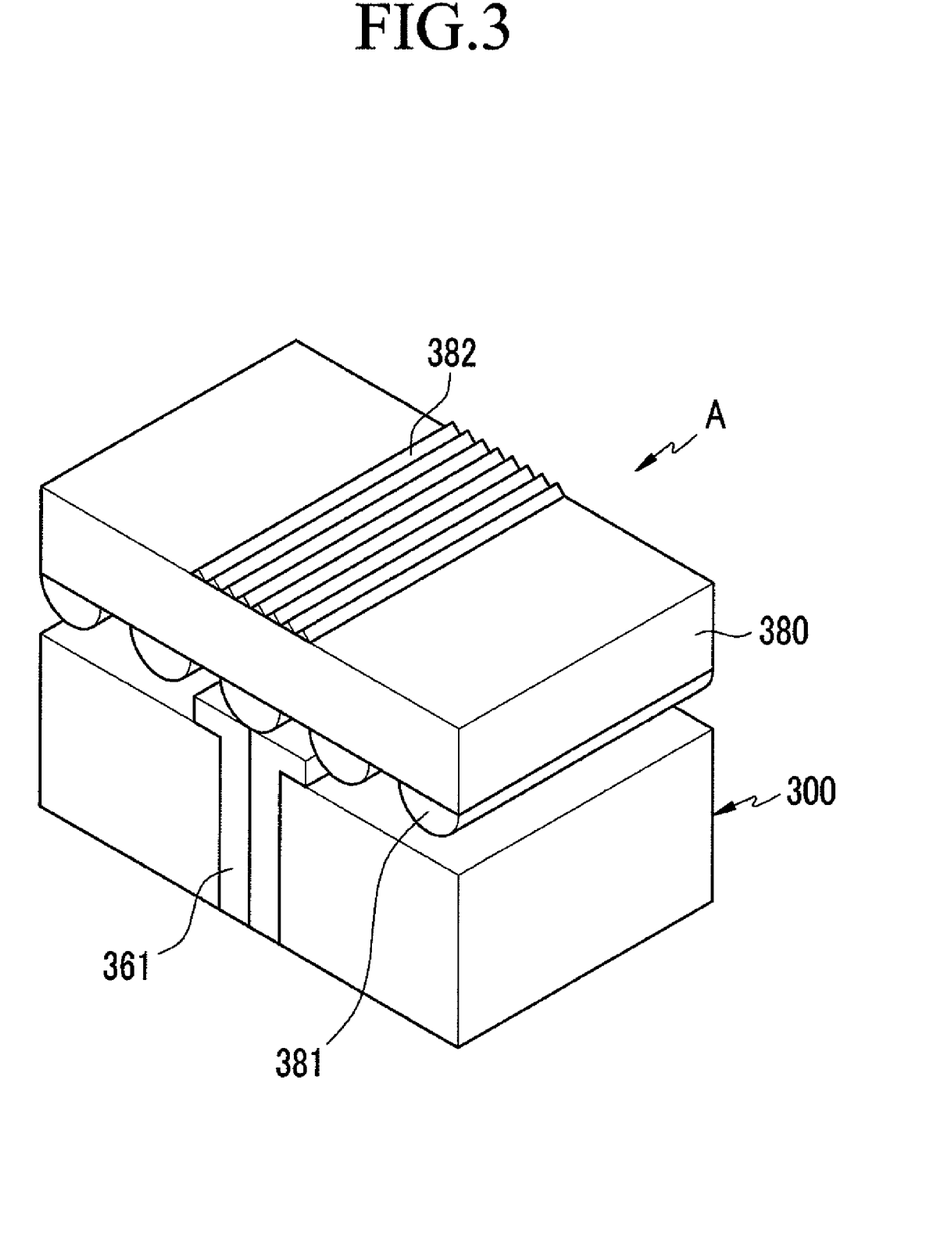
FIG. 3 is an exploded perspective view showing a region A of the tiled liquid crystal display shown in FIG. 1.
Figure 4:
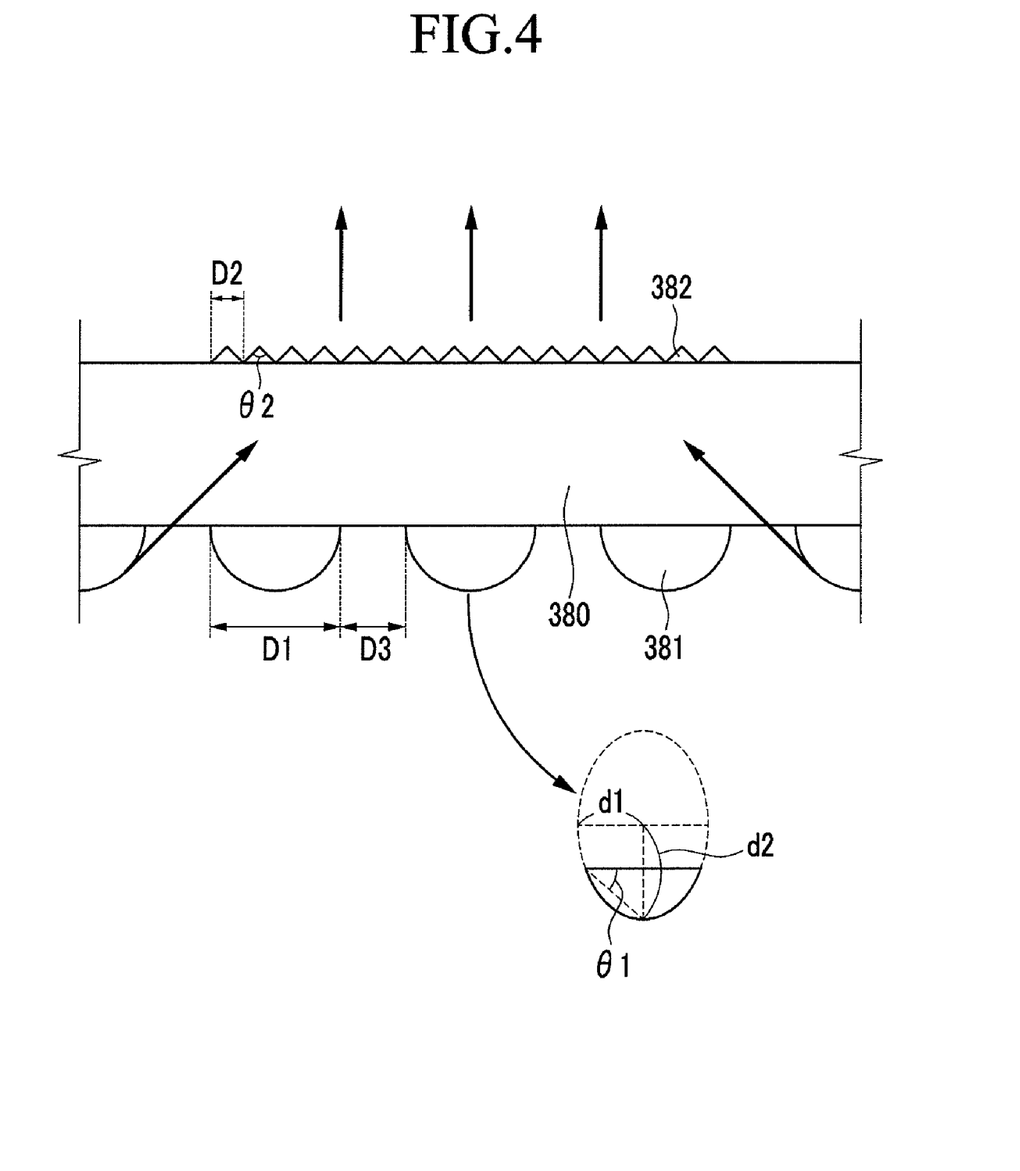
FIG. 4 is a cross-sectional view of an optical sheet according to an exemplary embodiment of the present invention.

FIG. 1 is a schematic diagram of a tiled liquid crystal display according to an exemplary embodiment of the present invention, FIG. 2 is an exploded perspective view showing a liquid crystal display of the tiled liquid crystal display of FIG. 1, FIG. 3 is an exploded perspective view showing a region A of the tiled liquid crystal display shown in FIG. 1, and FIG. 4 is a cross-sectional view of an optical sheet according to an exemplary embodiment of the present invention.

As shown in FIG. 1, a tiled liquid crystal display 1 includes a plurality of liquid crystal modules 350 that are connected to each other through a fastening member (not shown) such as a screw. The tiled liquid crystal display 1 includes an upper chassis 361, and the upper chassis 361 is positioned at a boundary between the liquid crystal modules 350.

FIG. 2 exemplary shows the liquid crystal module 350 of the tiled liquid crystal display 1, but the liquid crystal module 350 is not limited thereto and may be variously changed.

The liquid crystal module 350 includes a liquid crystal panel assembly 330 for displaying images, a backlight assembly 340 for generating light, molded frames 363 and 364 for receiving the liquid crystal panel assembly 330 and the backlight assembly 340, and the upper chassis 361 and a lower chassis 362. Hereafter, the chassis 361/362 may be referred to as a bezel. In addition, the two molded frames 363 and 364 may be made of one integrated molded frame.

The molded frames 363 and 364, the upper chassis 361, and the lower chassis 362 include coupling grooves 371, 372, 373, and 374, and neighboring liquid crystal modules 350 are coupled to each other through the coupling grooves 371, 372, 373, and 374 and the fastening members (not shown) neighboring the liquid crystal module 350. In addition, the molded frames 363 and 364 may not include the coupling grooves 373 and 374, and the positions, shapes, and kinds of coupling grooves and fastening members may be variously changed. In addition, in the event that the coupling grooves 371, 372, 373, and 374 and the fastening members are not used, the neighboring liquid crystal modules 350 may be coupled to each other in another way.

The liquid crystal panel assembly 330 includes a liquid crystal panel 300 for displaying images, driving chips 410 and 510, and flexible circuit boards 450 and 550. The liquid crystal panel 300 includes a thin film transistor (TFT) array panel (hereinafter, TFT display panel) 100, an opposite panel 200, and a liquid crystal layer (not shown) interposed between the TFT display panel 100 and the opposite panel 200. The liquid crystal panel 300 may have various structures.

The driving chips 410 and 510 for applying driving signals to gate lines and data lines may be mounted on the flexible circuit boards 450 and 550. To apply control signals for controlling the driving chips 410 and 510, the flexible circuit boards 450 and 550 are adhered to edges of the TFT display panel 100. In addition, the driving chips 410 and 510 are a gate line driving chip 410 and a data line driving chip 510 that may be formed as one integrated chip.

The backlight assembly 340 includes a light source 344, a light guide 342 for guiding a light path, optical sheets 343 for providing a uniform luminance of light emitted from the light guide 342, and a reflector 341 for reflecting light leaked from the light guide 342.

The light source 344 is positioned under the light guide 342. As the light source 344, a linear light source such as a cold cathode fluorescent lamp (CCFL), an external electrode fluorescent lamp (EEFL), and the like, or a light emitting diode (LED) having low power consumption, may be used. In addition, the light source may be disposed on one side of the light guide 342 or on both sides thereof. The light guide 342 may be omitted.

As shown in FIG. 3, a base film 380 is positioned on the upper chassis 361 receiving the liquid crystal panel 300.

The base film 380 may include transparent plastic or glass. For example, the plastic may include at least one of various resins such as polyethylene terephthalate (PET), polycarbonate (PC), and polymethyl methacrylate (PMMA). The base film 380 may protect the tiled liquid crystal display 1 from the external environment. The thickness of the base film 380 may be in the range of about 200 μm to about 250 μm. In addition, the base film 380 may include a single layer or two or more layers.

A lenticular pattern 381 is positioned at the lower surface of the base film 380, and a prism pattern 382 is positioned at the upper surface of the base film 380. A portion of the lenticular pattern 381 may contact the upper chassis 361.

The lenticular pattern 381 refracts light passing through the liquid crystal panel 300 in the direction of the upper chassis 361. The prism pattern 382 refracts light passing through the lenticular pattern 381 in the direction of a normal, e.g., z-direction, to the base film 380. Accordingly, the amount of light passing through the liquid crystal panel 300 near the upper chassis 361 is increased and the width of the upper chassis 361 appears narrower than the actual width, and as a result the display quality of the tiled liquid crystal display 1 may be improved.

The lenticular pattern 381 and the prism pattern 382 may include at least one resin of various kinds such as PET, PC, and PMMA. Here, the refractive index of the resin may be in the range of about 1.51 to about 1.55, and with this range, the amount of light passing through the liquid crystal panel 300 near the upper chassis 361 may be further increased.

The lenticular pattern 381 and the prism pattern 382 may be formed through an extrusion process or ultraviolet (UV) hardening process. For example, the resin is coated on the base film 380, a roll including the intaglio of the prism pattern 382 is rolled, and then the resin is hardened.

Referring to FIG. 4, the ratio of the width D1 of the lenticular pattern 381 and the width D2 of the prism pattern 382 may be in the range of about 1:1 to about 6:1. In this range, the case in which the upper chassis 361 between the liquid crystal modules 350 is recognized may be reduced. Furthermore, in the case that D1:D2 is 4:1, the recognition of the upper chassis 361 may be further reduced. When the width D1 of the lenticular pattern 381 is less than about 200 μm, it may be difficult to recognize the lenticular pattern 381. In addition, when the width D2 of the prism pattern 382 is more than about 50 μm, the prism pattern 382 may be easily molded.

The lenticular pattern 381 is extended in the length direction of the upper chassis 361, and several lenticular patterns 381 that are extended in the length direction are separated from each other by a uniform interval D3. The outermost lenticular pattern 381 among the several lenticular patterns 381 may be positioned near the edge of the liquid crystal panel 300. For example, in the case of a 46 inch liquid crystal panel, the outermost lenticular pattern 381 may be positioned about 10 cm from the boundary of the panel in the central direction thereof. The cross-sectional shape of the lenticular pattern 381 may be circular or oval. The curvature angle $\theta_1$ of the lenticular pattern 381 may be in the range of about 30 degrees to 60 about degrees and the curvature radius ratio $(d_2/d_1)$ is in the range of about 0.5 to about 5, and in this range, the amount of the light passing through the liquid crystal panel 300 near the upper chassis 361 may be further increased. For example, the curvature angle $\theta_1$ may be about 45 degrees and curvature radius ratio ($d_2/d_1$) may be about 1.

The ratio of the width D1 of the lenticular pattern 381 and the interval D3 of the lenticular pattern 381 may be in the range of about 1:1 to about 8:1. For this range, the case in which of the upper chassis 361 between the liquid crystal modules 350 is recognized may be reduced. Furthermore, in the case that D1:D3 is about 2:1, the recognition of the upper chassis 361 may be further reduced.

The prism pattern 382 is extended in the length direction of the upper chassis 361, and the boundaries of the several prism patterns 382 that are extended in the length direction meet each other. The several prism patterns 382 may cover the entire width of the upper chassis 361. The cross-sectional shape of the prism pattern 382 is triangular. The angle $\theta_2$ of the top portion of the prism pattern 382 may be in the range of about 70 degrees to about 110 degrees, and in this range, the amount of light passing through the liquid crystal panel 300 near the upper chassis 361 may be further increased. For example, the angle $\theta_2$ may be about 90 degrees.

Figure 5A:
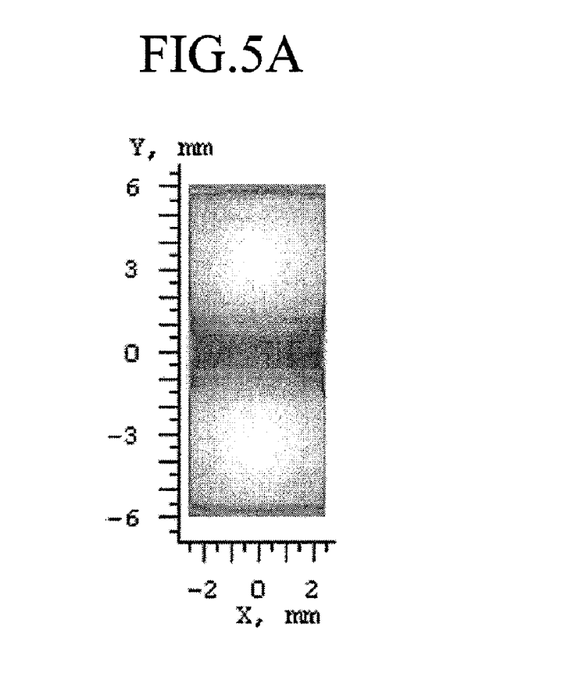
FIG. 5A, FIG. 5B, FIG. 6A, FIG. 6B, and FIG. 6C are graphs showing luminance of a region A of a tiled liquid crystal display according to exemplary embodiments of the present invention.
Figure 5B:
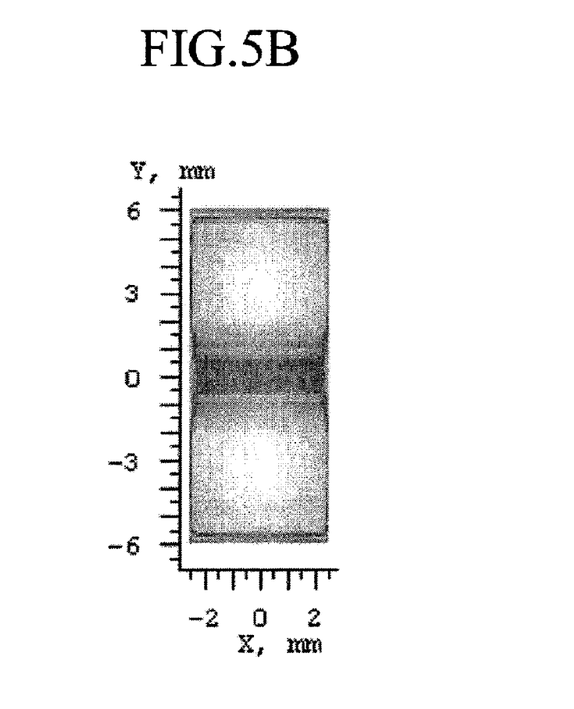

FIG. 5A and FIG. 5B are graphs showing the luminance distribution of a tiled liquid crystal display according to exemplary embodiments of the present invention (material=PET, $\theta_1$=45 degrees, $d_2/d_1$=1, $\theta_2$=90 degrees, optical sheet thickness=250 μm) by varying the ratio of D1:D2. In FIG. 5A, D1:D2 (D1=200 μm, D2=50 μm) is 4:1, and in FIG. 5B, D1:D2 (D1=50 μm, D2=50 μm) is 1:1. In each graph, the portion where the value y is 0 is the portion of the upper chassis 361 between the liquid crystal modules 350. Accordingly, the portion where the value y is 0 appears dark as the luminance difference of the liquid crystal modules 350 and the upper chassis 361 is increased, and thus the upper chassis 361 is recognized. In the graph shown in FIG. 5A, as compared to the graph of FIG. 5B, the upper chassis 361 is less recognizable.

Figure 6A:
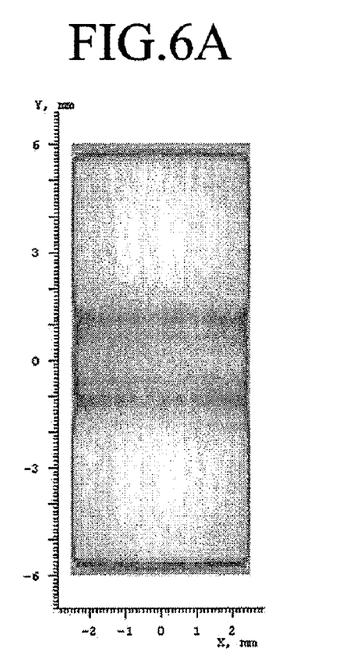
Figure 6B:
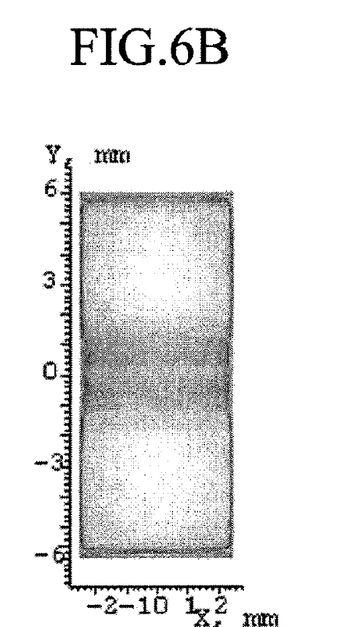
Figure 6C:
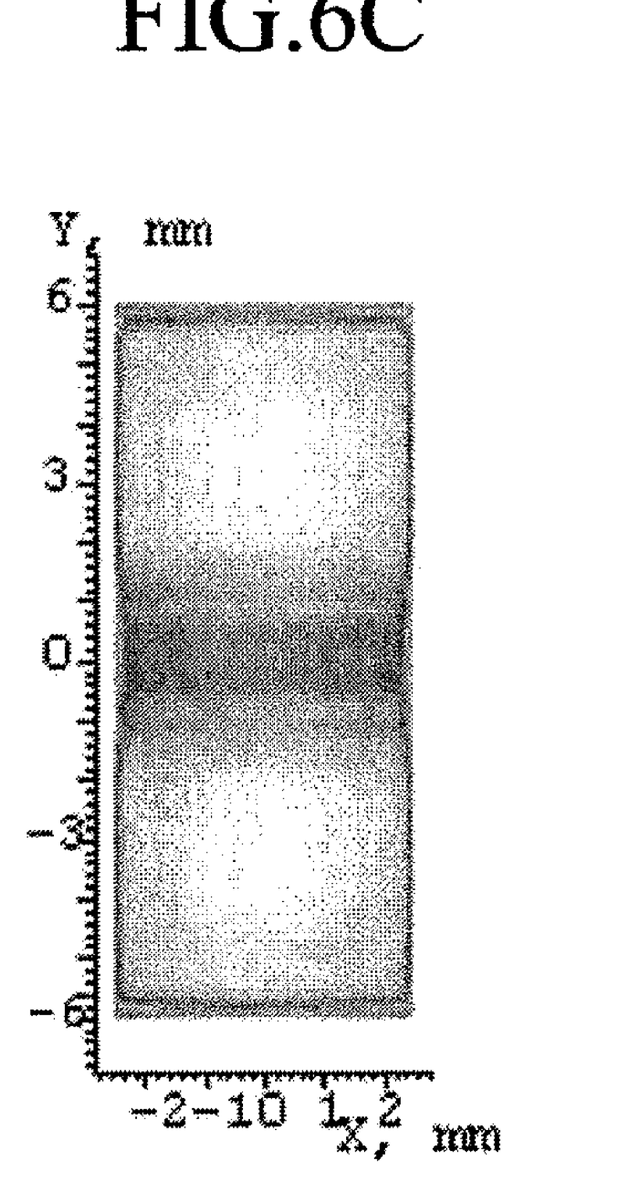

FIG. 6A, FIG. 6B, and FIG. 6C are graphs showing the luminance distribution of a tiled liquid crystal display according to exemplary embodiments of the present invention (material=PET, $\theta_1$=45 degrees, $d_2/d_1$=1, $\theta_2$=90 degrees, D2=50 μm, optical sheet thickness=250 μm) by varying the ratio of D1:D3. In FIG. 6A, D1:D3 (D1=200 μm, D3=100 μm) is 2:1, in FIG. 6B, D1:D3 (D1=200 μm, D3=50 μm) is 4:1, and in FIG. 6C, D1:D3 (D1=200 μm, D3=200 μm) is 1:1. In the graph shown in FIG. 6A, as compared to the graphs of FIG. 6A, FIG. 6B, and FIG. 6C, the upper chassis 361 is least recognizable.

In the above-described exemplary embodiments, the tiled liquid crystal display is described; however, exemplary embodiments according to the present invention may be applied to a tiled display device using various display devices such as an organic light emitting device, a plasma display device, and an electrophoretic display.

While the present invention has been described in detail with reference to the exemplary embodiments, those skilled in the art will appreciate that various modifications and substitutions can be made thereto without departing from the spirit and scope of the present invention as set forth in the appended claims.

What is claimed is:

1. A tiled display device, comprising:
   a plurality of display panels comprising a first display panel including a plurality of pixels and a second display panel including a plurality of pixels;
   a first lenticular pattern disposed between the first display panel or the second display panel and a base film;
   a first prism pattern disposed on the base film; and
   a chassis disposed between and fixing the plurality of display panels,
   wherein the tiled display device displays an image and the first display panel displays a first portion of the image and the second display panel displays a second portion of the image different from the first portion.

2. The tiled display device of claim 1, wherein the first lenticular pattern is disposed only adjacent to boundaries of the plurality of display panels, and the first prism pattern is disposed only adjacent to the boundaries of the plurality of display panels.

3. The tiled display device of claim 2, wherein the first prism pattern is part of a plurality of prism patterns covering an entire width of the chassis.

4. The tiled display device of claim 2, wherein a ratio of a width of the first lenticular pattern to a width of the first prism pattern is in a range of about 1:1 to about 6:1.

5. A tiled display device, comprising:
   a plurality of display panels comprising a first display panel including a plurality of pixels and a second display panel including a plurality of pixels;
   a first lenticular pattern disposed on the first display panel and the second display panel;
   a base film disposed on the first lenticular pattern;
   a first prism pattern disposed on the base film; and
   a chassis disposed between the plurality of display panels,
   the tiled display device further comprising a second lenticular pattern separated from the first lenticular pattern, wherein a ratio of the width of the first lenticular pattern to a distance by which the first and second lenticular patterns are separated along the same plane is in a range of about 1:1 to about 8:1.

6. The tiled display device of claim 5, further comprising a second prism pattern, wherein boundaries of the first and second prism patterns meet each other.

7. The tiled display device of claim 5, wherein the width of the first lenticular pattern is less than about 200 μm.

8. The tiled display device of claim 7, wherein a curvature angle of the first lenticular pattern is in a range of about 30 degrees to about 60 degrees, and a curvature radius ratio of the first lenticular pattern is in a range of about 0.5 to about 5.

9. The tiled display device of claim 5, wherein the width of the first prism pattern is more than about 50 μm.

10. The tiled display device of claim 9, wherein an angle of a top portion of the first prism pattern is in a range of about 70 degrees to about 110 degrees.

11. An optical sheet, comprising:
   a base film;
   a first lenticular pattern disposed on a first side of the base film, the first lenticular pattern comprising a curved surface and a first flat surface, the first flat surface disposed on the first side of the base film; and
   a first prism pattern disposed on a second side of the base film, the first prism pattern comprising a slanted surface protruding in a direction opposite that which the curved surface protrudes and a second flat surface, the second flat surface disposed on the second side of the base film,
   wherein a curvature angle of the first lenticular pattern is in a range of about 30 degrees to about 60 degrees, and a curvature radius ratio of the first lenticular pattern is in a range of about 0.5 to about 5.

12. The optical sheet of claim 11, wherein a ratio of a width of the first lenticular pattern to a width of the first prism pattern is in a range of about 1:1 to about 6:1.

13. The optical sheet of claim 11, further comprising a second lenticular pattern separated from the first lenticular pattern, wherein a ratio of a width of the first lenticular pattern to a distance by which the first and second lenticular patterns are separated along the same plane is in a range of about 1:1 to about 8:1.

14. The optical sheet of claim 13, further comprising a second prism pattern, wherein boundaries of the first and second prism patterns meet each other.

15. The optical sheet of claim 13, wherein a width of the first lenticular pattern is less than about 200 μm.

16. The optical sheet of claim 15, wherein a width of the first prism pattern is more than about 50 μm.

17. The optical sheet of claim 16, wherein an angle of a top portion of the first prism pattern is in a range of about 70 degrees to about 110 degrees.

18. The optical sheet of claim 11, wherein the first prism pattern overlaps the first lenticular pattern.

* * * * *